US007873199B2

(12) United States Patent
Rauscher et al.

(10) Patent No.: US 7,873,199 B2
(45) Date of Patent: Jan. 18, 2011

(54) METHOD AND DEVICE FOR VERIFYING VALUABLE DOCUMENTS

(75) Inventors: Wolfgang Rauscher, Munich (DE); Thomas Giering, Kirchseeon (DE)

(73) Assignee: Giesecke & Devrient GmbH, Munich (DE)

( * ) Notice: Subject to any disclaimer, the term of this patent is extended or adjusted under 35 U.S.C. 154(b) by 1049 days.

(21) Appl. No.: 10/535,409

(22) PCT Filed: Nov. 28, 2003

(86) PCT No.: PCT/EP03/13435

§ 371 (c)(1),
(2), (4) Date: Oct. 6, 2005

(87) PCT Pub. No.: WO2004/051582

PCT Pub. Date: Jun. 17, 2004

(65) Prior Publication Data

US 2006/0153437 A1 Jul. 13, 2006

(30) Foreign Application Priority Data

Nov. 29, 2002 (DE) ................................ 102 56 114

(51) Int. Cl.
*G06K 9/00* (2006.01)

(52) U.S. Cl. ...................................................... 382/135

(58) Field of Classification Search ............... 340/146.3
See application file for complete search history.

(56) References Cited

U.S. PATENT DOCUMENTS 4,277,774 A * 7/1981 Fujii et al. .................. 382/135
4,386,432 A 5/1983 Nakamura et al.
4,464,786 A 8/1984 Nishito et al.
5,542,518 A * 8/1996 Kurosawa et al. ........... 194/206
5,678,677 A * 10/1997 Baudat ....................... 194/206
5,757,001 A 5/1998 Burns
5,992,600 A 11/1999 Baudat
7,092,583 B2 * 8/2006 Ahlers et al. ................ 382/280
7,330,606 B2 * 2/2008 Yakhini et al. .............. 382/294

FOREIGN PATENT DOCUMENTS

DE 23 66 274 C2 11/1973

(Continued)

OTHER PUBLICATIONS

"Pattern Classification: A Unified View of Statistical and Neural Approaches", J. Schurmann, Daimler-Benz Research Center Ulm, John Wiley & Sons, Inc., 1996, pp. 62 and 66.

"Technische Bildverarbeitung—Maschinelles Sehen", B. Jahne, R. Massen, B. Nickolay, H. Scharfenberg, Springer-Verlag Berlin, 1995, pp. 80 and 81.

(Continued)

*Primary Examiner*—Vu Le
*Assistant Examiner*—Claire Wang
(74) *Attorney, Agent, or Firm*—Bacon & Thomas, PLLC

(57) ABSTRACT

A method and apparatus for checking value documents having an authenticity feature in the form of at least one luminescent substance, includes forming a measuring vector from the measuring values corresponding to different frequencies and/or frequency domains of the luminescence radiation, and performing an allocation of the measuring vector to one of a plurality of given reference vectors corresponding to different authenticity features by allocating at least one object allocation area to each reference vector and checking which object allocation area the measuring vector is located in.

18 Claims, 2 Drawing Sheets

FOREIGN PATENT DOCUMENTS

| | | | |
|---|---|---|---|
| DE | 30 40 963 | C2 | 5/1981 |
| DE | 101 13 268 | A1 | 9/2002 |
| EP | 0 101 115 | A1 | 2/1984 |
| GB | 1 439 173 | | 6/1976 |

OTHER PUBLICATIONS

"Image Based Measurement Systems", Ferdinand van der Heijden, University of Twente, The Netherlands, John Wiley & Sons, Inc., 1995, pp. 131, 132, 134, 135, 142 and 175.

* cited by examiner

METHOD AND DEVICE FOR VERIFYING VALUABLE DOCUMENTS

BACKGROUND

A. Field

This invention relates to a method and apparatus for checking value documents having an authenticity feature in the form of at least one luminescent substance, the value document being irradiated with light and the luminescence radiation emanating from the value document being detected with spectral resolution to determine whether the authenticity feature is actually present in the checked value document.

B. Related Art

According to the present invention, a luminescent, e.g. fluorescent or phosphorescent, authenticity feature will be understood to be a single substance or a mixture of a plurality of substances showing luminescent behavior.

There are a number of known systems for checking the authenticity of such value documents. One system is known for example from the applicant's DE 23 66 274 C2. In this system the authenticity of a bank note is checked, i.e. it is specifically checked whether a fluorescent authenticity feature is actually present in a bank note to be checked, by irradiating said note and detecting the remitted fluorescence radiation with spectral resolution. Evaluation is done by comparing the signals from different photocells of the spectrometer.

This method works very reliably in most cases, but in particular when there are a plurality of possible authenticity features having very similar spectral behavior, it may be difficult to distinguish them and thus decide which of said authenticity features is actually present in the checked value document.

On these premises it is the problem of the present invention to provide a method and apparatus for checking value documents which make it possible to distinguish authenticity features with a similar spectral pattern in a simple and reliable way.

SUMMARY OF THE INVENTION

The present invention is thus based on the finding that simple and reliable distinction between different authenticity features can be best obtained when a measuring vector is formed from the measuring values corresponding to different frequencies and/or frequency domains of the luminescence radiation, and an object allocation of allocation of the measuring vector to one of a plurality of given reference vectors corresponding to different authenticity features is done by allocating at least one object allocation area to each reference vector and checking which object allocation area the measuring vector is located in. The measuring vector can consist of the measuring values per se and/or quantities derived therefrom.

Preferably, determination of the object allocation areas and thus the object allocation of the measuring vector to one of the reference vectors can be done by comparing the measuring vector with a plurality of reference vectors or with at least one quantity which depends on at least two reference vectors.

A particularly preferred example of the first-mentioned variant can be that the authenticity feature whose reference vector has the smallest difference, such as the smallest distance, relative to the measuring vector is determined or determinable as present in the value document to be checked. This procedure has proved much more suitable in particular with authenticity features having a very similar spectral pattern than a procedure involving a check of whether the intensity and/or pattern of a measured luminescence radiation differs from the intensity or pattern of a reference radiation only by maximally a given value.

The second-mentioned variant, in which the measuring vector is not compared with each single reference vector itself but with at least one quantity derived from at least two reference vectors, significantly reduces the computation effort and is therefore of advantage in particular when high checking speeds are important. A particularly preferred example of this is that the quantity which depends on at least two reference vectors is formed as a separation plane between the two reference vectors, such as an (n−1) dimensional hyperplane between the two n-dimensional reference vectors, the separation plane separating the object allocation areas of the two reference vectors from each other. In this case, e.g. the position of the measuring vector relative to the separation plane is determined.

The inventive checking system can preferably be extended so as to have a further step for checking whether or not the amount of the measuring vector is greater than a given reference value. This step will particularly preferably be carried out before the step of allocating the object allocation areas and/or the step of checking which of these areas the measuring vector is located in. This makes it possible to obtain a significant time saving in the evaluation, since the subsequent, more time-consuming evaluation steps of checking the object allocation areas are no longer necessary if the simple amount check already yields a negative result.

This procedure proves expedient in particular in the check of authenticity features whose luminescence radiation is located to a significant extent in the invisible, e.g. ultraviolet or in particular infrared, spectral range. This amount comparison already make it possible to recognize e.g. a number of non-matching features in forged value documents which only emit in the visible spectral range. The measuring vector is thus preferably formed from measuring values of the infrared spectral range for the above-mentioned reasons, among others.

Preferably, it can be provided alternatively or additionally that the measuring vector and the reference vectors are normalized in a like way. With n-dimensional measuring and reference vectors this can be done for example by normalizing to an n−1 dimensional unit sphere, so that the amount of all normalized vectors is equal, i.e. specifically has the value 1.

Such normalization has the advantage of permitting a simple comparison of the measuring vector with the reference vectors which is largely independent of the actual quantity or concentration in which the authenticity feature is incorporated in the bank note or the actual level of the total intensity of the measured radiation. In contrast to known methods of color space analysis, for example, in which the absolute values of the individual color components are essential for correct color determination, this is not compulsory in the inventive luminescence check, since it relies substantially only on the form of the detected spectral curves and not their absolute intensity values.

In particular in the above-mentioned case of normalization, it can prove to be a disadvantage that the measurements have a background signal that does not come from the luminescence radiation and is superposed on the luminescence radiation. Said background signal disturbs the evaluation since normalization causes the relations of the measuring vectors to the reference vectors to change significantly in accordance with with the level of the background signals, thereby possibly leading to less accurate results of evaluation.

Preferably, the evaluation of the measuring values therefore takes account of a background signal that does not come from the luminescence radiation. Specifically, an amount depending on the magnitude of the background signal can be subtracted from the measuring values for forming the measuring vector. The amount can vary from measuring value to measuring value of the measuring vector, i.e. a background vector produced by the background signal can also be used. The amount will particularly preferably be dependent on the magnitude of a minimum and/or maximum of the measuring values and/or a ratio of a plurality of measuring values to each other. If the emission spectrum of the background signal is known, the background vector can be calculated by measuring the background signal at a single or e.g. a few frequencies. If the background vector is known, it can be e.g. stored in the sensor and be subtracted from the measuring values without measurement.

DESCRIPTION OF THE DRAWINGS

Further advantages of the present invention result from the enclosed dependent claims and the subsequent description of preferred embodiments, in which

DETAILED DESCRIPTION OF PREFERRED EMBODIMENT

The inventive checking system can be used in all apparatuses that check luminescent authenticity features. Although not restricted thereto, the following description will concern the particularly preferred variant of checking bank notes in bank note bank note processing apparatuses, which can be used for example for counting, sorting, depositing and/or dispensing bank notes.

Figure 1:
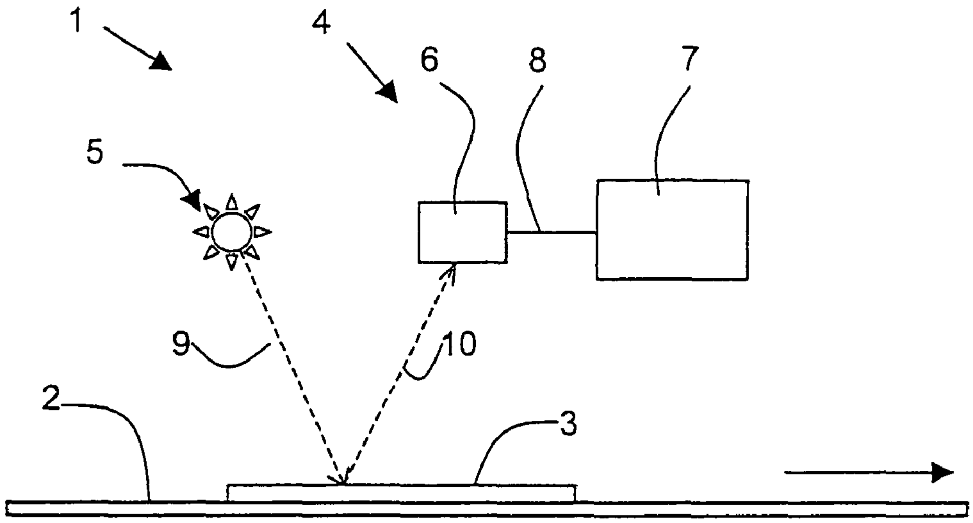
FIG. 1 shows a schematic view of a checking device according to a first embodiment.

FIG. 1 shows specifically an apparatus 1 which includes, along with components known per se which are not shown, a transport device 2 for transporting bank notes 3 singly past a checking device 4. The checking device 4 can be designed for checking authenticity, fitness or denomination of the bank notes 3. The checking device 4 specifically has a light source 5, a spectral sensor 6 and an evaluation device 7 which is connected via a signal line 8 at least with the spectral sensor 6. The light source 5 serves to irradiate the bank note 3 with light beams 9 at an oblique angle to the bank note surface, and the spectral sensor 6 to detect and spectrally decompose the radiation 10 remitted by the bank note surface. The spectral sensor 6 preferably detects luminescence radiation 10 in the infrared spectral range by means of a spectrometer 6. The signals detected by the spectral sensor 6 are transferred via the signal line 8 to the EDP-based evaluation device 7 which checks on the basis of the measured signals whether a certain authenticity feature is present in the bank note 3.

The apparatus 1 is characterized in particular by the manner of evaluation of the measuring signals in the evaluation device 7. This can be done for example in the following way in accordance with one embodiment of the inventive method.

All or at least a subset of the measuring values of the spectral sensor 6 which each correspond to different frequencies or frequency domains are represented as measuring vector X. Let the measuring vector $X=(x_1, \ldots x_n)$ be for example a measure of the spectral curve of the sensed luminescence radiation 10 of the bank note 3, where $x_1$ to $x_n$ are values formed on the basis of the measuring signals from n different photocells of the spectral sensor 6. The spectral values $x_1$ to $x_n$ can preferably correspond to the measured luminescence intensity at different frequencies or frequency domains in a spectral range invisible to the eye, e.g. the ultraviolet or particularly preferably infrared spectral range. The measuring vector X is thus a measure of the form, i.e. the course, of the measured spectral curve, at least in the case n>1, preferably $n \geqq 5$ or $n \geqq 10$.

A comparison of this measuring vector X with k given reference vectors $A_1, \ldots, A_k$ will be carried out in the way described by way of example hereinafter. For clarity's sake, with reference to FIGS. 2 and 3 a simple case is described in which the measuring vector X has only two measuring values $x_1$ and $x_2$, i.e. the vector dimension n equals 2. In this case the measuring vector X is represented by a point X in the two-dimensional diagrams of FIG. 2 and FIG. 3, each axis of the diagrams corresponding to a different coordinate of the measuring vector X.

The vectors $A=(a_1, \ldots, a_n)$ and $B=(b_1, \ldots, b_n)$ are in exemplary fashion two given reference vectors $A_1=A$, $A_2=B$ which correspond to the spectral curves from two possible authenticity features one of which might be present in the checked bank note 3.

To decide whether one of the two permissible authenticity features is present in or on the bank note at all, it can first be checked whether the amount of the measuring vector X, i.e. $|X|$, exceeds a given threshold. If this is not the case, the bank note can already be rejected as false here. The threshold can be 0, but is preferably selected so that forgeries without an authenticity feature are already distinguishable reliably here. This reference value R has in the exemplary case of FIGS. 2 and 3 for example an amount $|R|$ of 0.4. This check can also be used to separate out forgeries in which the authenticity features are actually present but in deficient concentration. This is particularly preferred because measurement is done in the infrared spectral range in the described variant and forgeries normally have intensities in this spectral range that are either negligible or at least considerably lower than the intensities of the authenticity features A, B in authentic bank notes 3.

As mentioned, this criterion that the amount $|X|$ of the measuring vector X must at least correspond to a reference value R is used particularly preferably for pre-evaluating the measuring values. This can mean, for example, that this minimum value comparison of the amount $|X|$ of the measuring vector X is carried out first before the object allocation of the reference vector A, B with the smallest difference relative to the measuring vector X is carried out. This variant of the preceding amount check can significantly increase the speed of the bank note check.

If the amount of the measuring vector X is above the given threshold, it must be decided which of the authenticity features A, B is actually present in the bank note 3.

Figure 3:
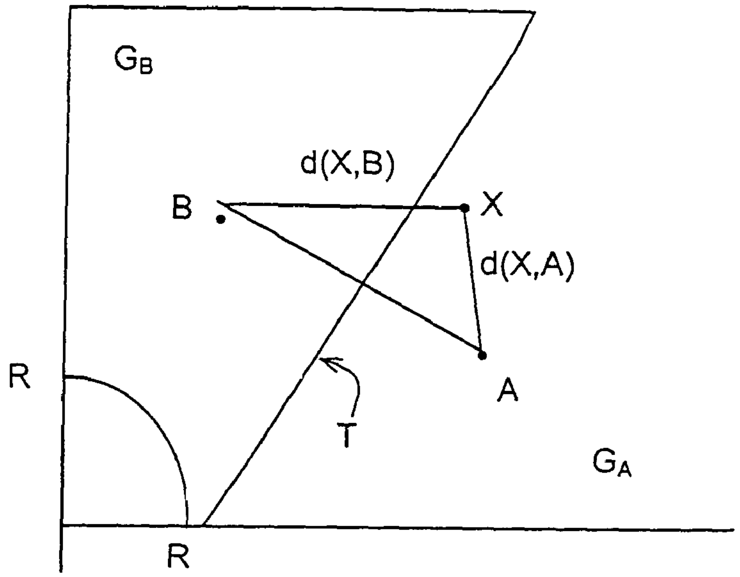
FIG. 3 shows a two-dimensional representation to illustrate the inventive method of object allocation.

For this purpose the following procedure can be implemented. The affine space $IR^n$ where the measuring and reference vectors $(X, A_1, \ldots, A_k)$ are located is divided into object allocation areas $G_i \subseteq R^n$ (i=1, . . . , l), said areas being allocated to the reference vectors $(A_1, \ldots, A_k)$. In the simplest case, there is exactly one object allocation area for each reference vector, in the general case there can be a plurality of object allocation areas for each reference vector. To decide which authenticity feature is present in or on the bank note 3, it is ascertained which object allocation area $G_m$ the measuring vector X is located in, i.e. the index m is sought with $X \in G_m$. In the two-dimensional example shown, these areas are half-planes $G_A$, $G_B$, as illustrated in FIG. 3. In the general case the object allocation areas are averages of a finite number of half-planes.

The object allocation areas can be defined either via the reference vectors A, B (in the general case $A_1, \ldots, A_k$) or via a description of the hyperplanes limiting them.

In the first-mentioned case, for example that reference vector A, B is determined which has the smallest difference relative to the measuring vector X. For this purpose the distance of the measuring vector X relative to all possible authenticity features, i.e. in the specifically described case to the two reference vectors A, B, can be calculated. The distance can be calculated as the Euclidean distance between the vectors in question, i.e. in the example d(X,A) and d(X,B). Instead of the Euclidean distance, any function d(X,A) can be used with the following property: for any measuring vectors X and reference vectors A, B it holds that $d(X,A) \geqq d(X,B)$ exactly when $|X-A| \geqq |X-B|$ holds.

Alternatively, this procedure can be implemented in another way which leads exactly to the same result. The object allocation areas are defined in the second-mentioned case by a separation plane T which limits the two reference vectors A, B (in the general case $A_1, \ldots, A_k$). This variant has the advantage of reducing the computation effort particularly in real time environments.

To test whether a measuring vector X is located in an object allocation area $G_i$ (i.e. $X \in G_i$) one must check whether X is on the "right" side for all separation planes T limiting $G_i$. As separation planes, n−1 dimensional hyperplanes T can preferably be described e.g. as sets of points $\{(y_1, \ldots, y_n) \in R^n | u_1 y_1 + \ldots + u_n y_n - u_0 = 0\}$ where $(u_1, \ldots, u_n)$ is a normal vector of the hyperplane T. The sign of $u_1 x_1 + \ldots + u_n x_n - u_0$ states which side of the hyperplane T the measurement X is located on.

To increase detection certainty, it can be required in a preferred embodiment of the method that an allocation of the measuring vector X to one of the reference vectors A, B is only done when their mutual distance d(X,A) or d(X,B) does not exceed a given threshold.

It can accordingly be specified that the object allocation areas $G_A$, $G_B$ are delimited such that the object allocation areas no longer touch each other. This results between the object allocation areas $G_A$, $G_B$ in "no man's land", i.e. areas not allocated to any class or thus any reference vector $A_1, \ldots, A_k$. Bank notes 3 whose measuring vectors are located in these areas can e.g. be provided with a warning and rejected after the check in the checking device 4 or diverted into a special bin.

In a possible extension of the method, the object allocation areas are specified taking into account that the probability of a measuring vector X corresponding to one of at least two reference vectors A, B is not uniformly distributed but has e.g. a correlation.

In the hitherto described methods, however, it must be heeded that the distance of the measuring vector X from the reference vectors A, B increases with its intensity and the intensity of the individual reference curves A, B. This means that when one of the two possible authenticity features is incorporated in the checked bank note 3 in a considerably higher quantity and concentration, the distance of its reference vector A or B from the measuring vector X can also be accordingly greater.

To find a distance measure of the authenticity features A, B which is independent of the measured total intensity or the quantity and concentration of the individual authenticity features in the bank note 3, both the reference vectors A, B and the measuring vector X are normalized in an especially advantageous embodiment of the invention. In the case of the two-dimensional representation according to FIG. 2, a normalization to the unit circle E is carried out for example. This means that the normalized vectors A/|A| (that is, A over amount of A), B/|B| and X/|X| are formed which all have a normalized amount of 1. In the general n-dimensional case of k reference vectors $A_1, \ldots, A_k$ each having n components, the projection is done to the n-dimensional unit sphere E.

Figure 2:
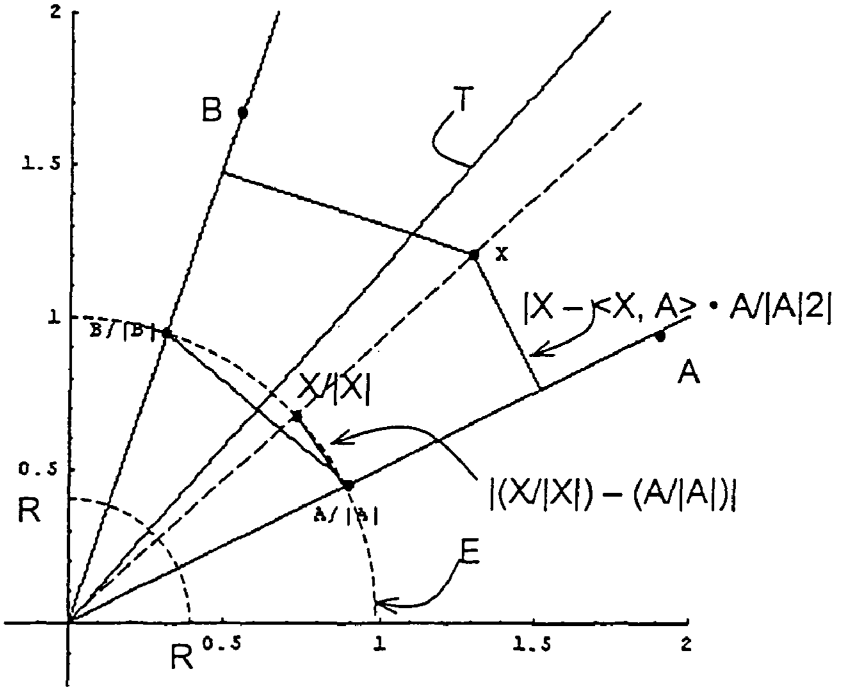
FIG. 2 shows a two-dimensional representation to illustrate the inventive method.

With this normalization, all measuring vectors X differing only in length are identified. They are located, as shown in FIG. 2, on lines through the origin of the measuring vector X. This procedure corresponds to the transition from the affine space $IR^n$ into a projective space $IP^{n-1}$ whose elements in the associated affine space are lines through the origin, which will be described in the following likewise by the associated vectors X, A, B . . . The transition into a projective space has proved very advantageous in particular in the check of authenticity features having similar spectral behavior.

To perform the allocation of the measuring vector X to one of the reference vectors A, B shown in the example, the distance d(A,X) and d(X,B) of the normalized measuring vector X/|X| from all normalized reference vectors A/|A| or B/|B| is calculated in the simplest case. The classification is done in turn for the authenticity feature whose reference vector A, B has the smallest distance d(X,A) d(X,B) from the measuring vector X, i.e. the authenticity feature A in the case shown.

As distance d(X,A) of two vectors, the Euclidean distance of the normalized vectors X, A can be used for example in this and the above-mentioned case:

$$d(X, A) = \left| \frac{X}{|X|} - \frac{A}{|A|} \right|.$$

Instead of the Euclidean distance, any function d(X,A) can be used with the following property: for any measuring vectors X and reference vectors A, B it holds that $d(X,A) \geqq d(X,B)$ exactly when it holds that $$\left| \frac{X}{|X|} - \frac{A}{|A|} \right| \geq \left| \frac{X}{|X|} - \frac{B}{|B|} \right|.$$

In a first example, the distance d(X,A) of the vectors X and A used can be the angle between lines through the origin defining them.

In a second example, the distance d(X,A) of the vectors X and A used can be the following term: $d(X,A) = |X - (X,A) \cdot A / |A|^2|$. The distance d(X,A) corresponds here to the length of the perpendicular from X to the line through the origin defined by A.

In a further example, the distance d(X,A) of the vectors X and A used can be the following term: $d(X,A) = |X - (X,A) \cdot A / |A|^2|^2$. This term is preferred particularly when the distance must be calculated time-critically, since the elaborate calculation of the root in the second example is unnecessary here.

In a further example, the distance d(X,A) of the vectors X and A used can be the term $$d(X, A) = g\left(\left|\frac{X}{|X|} - \frac{A}{|A|}\right|\right)$$

where g is any strictly monotonic function.

For the embodiment described in detail hereinabove, numerous developments and alternatives are conceivable.

Although the case of only two possible authenticity features was described and shown in the figures by way of example, it is of course also possible to generalize to more than two authenticity features. It is likewise of course possible to generalize to measuring and reference vectors X, $A_1, \ldots, A_k$ which have more than n=2 components, i.e. more than two spectral measuring values per bank note 3.

Further, it can also be provided that the luminescence radiation 10 of a bank note 3 is measured at different times and this taken into account in the evaluation. Firstly, it can be ascertained here whether the measured radiation 10 of the checked bank note 3 actually has the expected time response for the particular type of luminescence. Preferably, the bank notes 3 are irradiated by the light source 5 intermittently in time to permit e.g. the decay behavior of the luminescence radiation 10 to be measured with time resolution. In this case a time-dependent representation of the measuring vectors X and/or the reference vectors A, B can particularly preferably also be selected and the distance formed time-dependently.

A further idea of the present invention is that the luminescence radiation is measured only on predetermined partial areas of the bank note surface, which in particularly particularly preferred fashion are selected denomination-specifically. This can be done for example by the light source 5 illuminating only one or a plurality of special partial areas of the bank note 3 during transport past a checking device 3, or taking account of information about the position of the particular illuminated partial areas of the bank note 3 during evaluation in the evaluation device 7. This location-dependent measurement of the luminescence radiation 10 can be used for example to permit distinction of spatially coded authenticity features which are incorporated inhomogeneously within the bank note paper.

Furthermore, the luminescence radiation 10 need not necessarily be measured and evaluated in reflection; this can alternatively or additionally be done in transmission.

As mentioned, evaluation can be disturbed when the measuring signals have a background signal which does not come from the luminescence radiation and is superposed on the luminescence radiation 10. Such disturbing background signals distort the relations of the individual measuring vectors to the reference vectors during normalization.

Figure 4:
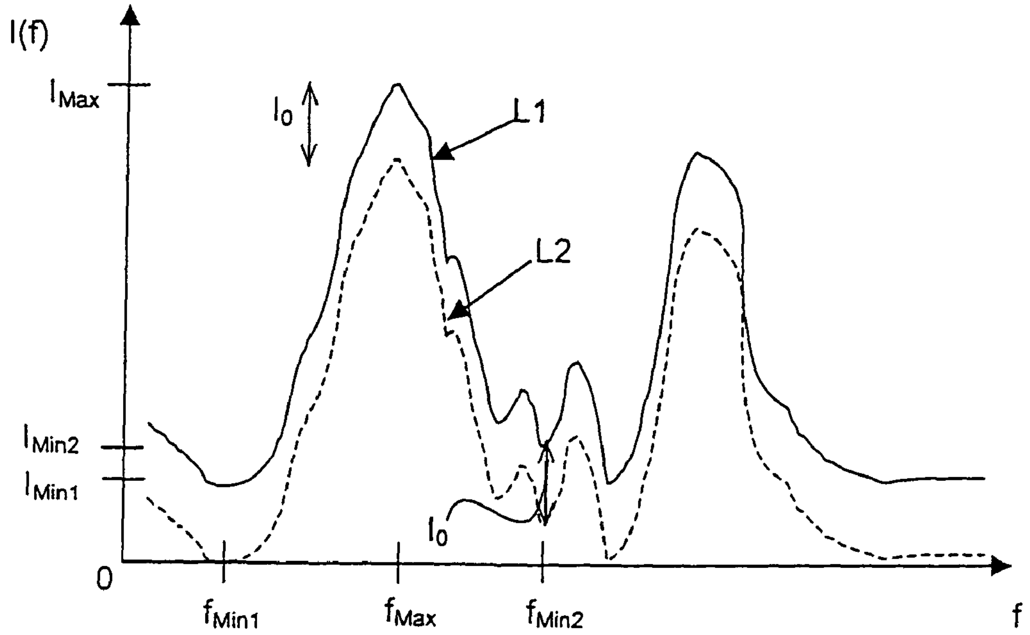
FIG. 4 shows a schematic view of a spectral curve L1 measured from a bank note, and a component L2 of the spectral curve L1 coming only from the luminescence radiation.

To illustrate the problem, FIG. 4 shows schematically by the unbroken line L1 the spectral pattern of the measuring signals of an illuminated bank note 3 measured by the spectral sensor 6, i.e. the dependence of measuring signal intensity I (f) on measuring signal frequency f. The portion of the measuring curve L1 actually only coming from the luminescence radiation 10, corresponding to the dashed curve L2, is smaller in terms of amount, however, and superposed by a disturbing background signal which does not come from the luminescence radiation 10.

To strip out this background signal, a reference measurement can firstly be done in a bank note gap. Measuring values are recorded by means of the spectral sensor 6 precisely when no bank note 3 is located in the detection area of the spectral sensor 6. The thus obtained signals are then a measure of the strength of the background signal and can be taken into account in the subsequent formation or evaluation of the measuring vectors, e.g. subtracted from the measuring values during measurement of the following bank note 3.

However, there are spectral sensors 6 in which measuring conditions so clearly differ in measurement with a bank note 3 as compared to measurement without a bank note 3 that the background signals measured in the case without a bank note are not representative of the background signals measured with a bank note.

Alternatively it is therefore possible e.g. to determine the magnitude of a relative, preferably the absolute, minimum and/or maximum of the measuring signals in a spectral range used for further evaluation. This can be e.g. a place in the spectrum where the luminescent substances to be checked normally do not emit. In the spectrum of FIG. 4 this minimum is located by way of example at the frequency $f_{Min1}$ and has an intensity $I_{Min1}$. By subtracting this minimal intensity value $I_{Min1}$ at least from the component of the spectrum to be subsequently evaluated further, i.e. forming the difference $I(f)-I_{Min1}$ for the considered spectral range, one obtains an effective measuring signal which comes substantially only from the luminescence radiation 10, corresponding to the curve L2, and in which the background signals are substantially subtracted.

A further variant is the following. Since the luminescent substances to be detected have a known spectral curve, the ratio of the intensity of the luminescence radiation at two different frequencies has a constant known value. The two frequencies can preferably be selected so as to correspond to a maximum and a minimum of the spectral curve. In the case of FIG. 4, let e.g. the intensity ratio $I(f_{Max})/I(f_{Min2})$ of the luminescence radiation 10, corresponding to curve L2, equal a constant value $k_0$. However, the measuring curve L1 actually obtained during the check of the bank note 3 has an intensity ratio $I(f_{Max})/I(f_{Min2})=I_{Max}/I_{Min2}$ which is lower than this value $k_0$. This difference is caused precisely by the background signals superposed on the luminescence spectrum L2.

It is now calculated by what measure 10 the intensity of the total spectrum I(f) must be lowered so that the intensity ratio $I(f_{Max})/I(f_{Min2})$ again corresponds to the value $k_0$ typical of the expected luminescence radiation 10. By subtracting this value $I_0$ from the total considered spectral range of the curve L2, one again obtains an effective measuring signal which comes substantially only from the luminescence radiation 10, corresponding to the curve L2, and in which the background signals are substantially subtracted.

It should be emphasized that instead of a linear offset, i.e. subtraction of a constant value $I_{Min1}$ or $I_0$ from the measuring intensity I(f) of the measuring curve L2, another, nonlinear offset can also be subtracted in which the subtracted value varies with the frequency f. That is, the amount can differ from measuring value to measuring value of the measuring vector, i.e. a background vector produced by the background signal can also be used. This is expedient when the background signals also have a non-linear pattern, i.e. an inconstant amount over all frequencies f. If the emission spectrum of the background signal is known, the background vector can be calculated by measuring the background signal at only one or a plurality of frequencies. If the background vector is known, it can e.g. be stored in the sensor and subtracted from the measuring values without measurement.

Moreover, the stated methods for compensating the background signals can also be advantageously used in other luminescence evaluating methods independently of the subject matter of the main claims.

The inventive procedure consequently permits a simple and reliable check and distinction of authenticity features, in particular having a very similar spectral pattern, which can be contained in value documents.

The invention claimed is:

1. A method for checking a value document having an authenticity feature in the form of at least one luminescent substance, comprising the steps of:

irradiating the value document with light from a light source, thereby causing the value document including said luminescent substance to emanate luminescence radiation;

detecting said luminescence radiation emanating from the value document with spectral resolution by using a spectral sensor;

forming, a measuring vector (X) from measuring values corresponding to different frequencies and/or frequency domains of the luminescence radiation; and causing an evaluation device to perform an object allocation of the measuring vector (X) to one of a plurality of given reference vectors ($A_1, \ldots, A_k$) corresponding to different authenticity features by allocating at least one object allocation area ($G_1, \ldots, G_1$) to each reference vector ($A_1, \ldots, A_k$) and checking which object allocation area ($G_1, \ldots, G_1$) the measuring vector (X) is located in to determine whether an authenticity feature corresponding to one of the reference vectors is present in the value document.

2. The method according to claim 1, including a further step for checking whether the amount (|X|) of the measuring vector (X) is greater than a given reference value (R).

3. The method according to claim 2, wherein the step of checking whether the amount (|X|) of the measuring vector (X) is greater than a given reference value (R) is carried out before the step of allocating the measuring vector (X) to one of a plurality of given reference vectors ($A_1, \ldots, A_k$).

4. The method according to claim 1, wherein the measuring vector (X) and the reference vectors ($A_1, \ldots, A_k$) are normalized.

5. The method according to claim 1, wherein the object allocation of the measuring vector (X) to one of the reference vectors ($A_m$) is done by comparing the measuring vector (X) with a plurality of reference vectors ($A_1, \ldots, A_k$) and/or with at least one quantity (T) which depends on at least two reference vectors ($A_1, \ldots, A_k$).

6. The method according to claim 1, wherein the object allocation of the measuring vector (X) to one of the reference vectors ($A_m$) is done by determining a smallest distance (d(X), $A_m$)) from the measuring vector (X) to the reference vectors ($A_1, \ldots, A_k$).

7. The method according to claim 1, wherein a quantity (T) which depends on at least two reference vectors (A, B) is formed as a separation plane (T) between the two reference vectors (A, B), the separation plane (T) separating the object allocation areas ($G_A$, $G_B$) of the two reference vectors (A, B) from each other.

8. The method according to claim 7, wherein a quantity (T) which depends on at least two reference vectors (A , B) is formed as a separator plane (T), characterized in that the object allocation of the measuring vector (X) to one of the reference vectors ($A_m$) is determined by determining a position of the measuring vector (X) relative to the separation plane (T).

9. The method according to claim 1, wherein the luminescence radiation is measured with time resolution on a value document to be checked, such that the comparison of measuring vector (X) and reference vectors (A, B) can be done time-dependently.

10. The method according to claim 1, wherein the measurement of the luminescence radiation is done only on one or more predetermined partial areas of a surface of the value document which can be predetermined denomination-specifically.

11. The method according to claim 1, wherein the measuring vector (X) comprises measuring values of an invisible spectral range.

12. The method according to claim 1, wherein evaluation of the measuring values takes account of a background signal (L2-L1) which does not come from the luminescence radiation.

13. The method according to claim 12, wherein, for forming the measuring vector, an amount depending on the magnitude of the background signal (L2-L1) is subtracted from the measuring values.

14. The method according to claim 13, wherein the amount is dependent on the magnitude of a minimum and/or maximum of the measuring values and/or a ratio of two measuring values.

15. Apparatus for checking value documents having an authenticity feature in the form of at least one luminescent substance, comprising:

a light source for irradiating the value document;

a spectral sensor for detecting with spectral resolution luminescence radiation emanating from the value document, and having an evaluation device connected to the spectral sensor for determining whether the authenticity feature is present in the value document, wherein the evaluation device is arranged to form a measuring vector (X) from the measuring values corresponding to different frequencies and/or frequency domains of the luminescence radiation, and is further arranged to do an object allocation of the measuring vector (X) to one of a plurality of given reference vectors ($A_l, \ldots, A_k$) corresponding to different authenticity features by allocating at least one object allocation area ($G_1, \ldots, G_l$)to each reference vector ($A_1, \ldots, A_k$)and checking which object allocation area the measuring vector (X) is located in.

16. The method according to claim 7, wherein the separation plane (T) is an (n−1) dimensional hyperplane.

17. The method according to claim 11, wherein the invisible spectral range is an infrared spectral range.

18. The method according to claim 11, wherein the invisible spectral range is an ultraviolet spectral range.

* * * * *